United States Patent
Monte

(10) Patent No.: US 8,591,646 B2
(45) Date of Patent: Nov. 26, 2013

(54) CONSTRUCTION MATERIALS AND COMPOSITIONS FROM OIL-CONTAINING FILLER

(75) Inventor: Salvatore J. Monte, Staten Island, NY (US)

(73) Assignee: S&E Innovative Technologies LLC, Bayonne, NJ (US)

(*) Notice: Subject to any disclaimer, the term of this patent is extended or adjusted under 35 U.S.C. 154(b) by 0 days.

(21) Appl. No.: 13/821,042

(22) PCT Filed: Aug. 17, 2011

(86) PCT No.: PCT/US2011/048039
§ 371 (c)(1),
(2), (4) Date: May 10, 2013

(87) PCT Pub. No.: WO2012/033617
PCT Pub. Date: Mar. 15, 2012

(65) Prior Publication Data
US 2013/0233206 A1  Sep. 12, 2013

Related U.S. Application Data

(60) Provisional application No. 61/381,790, filed on Sep. 10, 2010.

(51) Int. Cl.
C04B 26/26 (2006.01)
C04B 28/02 (2006.01)
C04B 40/00 (2006.01)

(52) U.S. Cl.
USPC ............ 106/802; 106/281.1; 106/284.02; 106/284.1; 106/284.3; 106/671; 106/724; 106/725; 106/727; 106/778; 106/781; 106/806; 106/808; 106/809; 106/823; 524/118; 524/127; 524/128; 524/155; 524/174; 524/175; 524/176

(58) Field of Classification Search
USPC ........... 106/281.1, 284.02, 284.1, 284.3, 671, 106/724, 725, 727, 778, 781, 802, 806, 808, 106/809, 823; 524/115, 127, 128, 155, 174, 524/175, 176
See application file for complete search history.

(56) References Cited

U.S. PATENT DOCUMENTS

| | | | |
|---|---|---|---|
| 5,277,519 A | 1/1994 | Nahm | |
| 5,700,107 A | 12/1997 | Newton | |
| 6,761,932 B2 * | 7/2004 | Salter | 427/402 |
| 6,911,077 B2 * | 6/2005 | Zucker | 106/644 |
| 7,204,879 B2 * | 4/2007 | Zucker | 106/644 |
| 8,323,395 B2 * | 12/2012 | Verbist et al. | 106/287.19 |
| 2006/0155029 A1 * | 7/2006 | Zucker | 524/394 |
| 2010/0152347 A1 | 6/2010 | Mahoney et al. | |

FOREIGN PATENT DOCUMENTS

RU 2184095 6/2002
WO 92/15536 9/1992

OTHER PUBLICATIONS

International Search Report dated Jan. 13, 2012, issued in corresponding PCT Application No. PCT/US2011/048039, 4 sheets.
Anonymous, "Deepwater Horizon Oil Spill Response Treatment, Reuse and Disposal Options," Florida Depratment of Environmental Protection, May 19, 2010, XP002663366, Florida, USA, 43 sheets.

* cited by examiner

*Primary Examiner* — Anthony J Green
(74) *Attorney, Agent, or Firm* — Kenyon & Kenyon, LLP

(57) ABSTRACT

The present invention relates to construction materials comprising at least one binder, at least one oil-containing filler and at least one metallate additive according to formula (1):

$$(RO)_m\text{-M-}(O_a\text{—}X_b\text{—}R'_c\text{—}Y_d)_n \qquad (1)$$

wherein M is one of titanium and zirconium. The present invention also relates to methods of preparing and using the inventive construction materials. The inventive construction material compositions are capable of utilizing oil-containing fillers in which the oil is stable in the final composition and the desired mechanical properties of the construction material are maintained or improved.

38 Claims, 4 Drawing Sheets

A　　　　　　B　　　　　　C　　　　　　D

CONSTRUCTION MATERIALS AND COMPOSITIONS FROM OIL-CONTAINING FILLER

CROSS REFERENCE TO RELATED APPLICATIONS

The present application is the national stage entry of International Patent Application No. PCT/US2011/048039, filed on Aug. 17, 2011, which claims priority to U.S. Provisional Patent Application Ser. No. 61/381,790, filed on Sep. 10, 2010.

FIELD OF THE INVENTION

The present invention relates to construction materials comprising at least one binder, at least one oil-containing filler and at least one metallate additive according to formula (1):

$$(RO)_m\text{-M-}(O_a\text{—}X_b\text{—}R'_c\text{—}Y_d)_n \quad (1)$$

wherein M is one of titanium and zirconium; R and R' are independently an alkyl, alkenyl, alkynyl, aralkyl, aryl or alkaryl group having up to 20 carbon atoms or halogen or either substituted derivatives thereof; O is oxygen; X is selected from the group consisting of carboxyl, alcoholate, sulfonyl, phosphate, pyrophosphate, and phosphite; and Y is one of a methacrylate, acrylate, mercapto and an amine group; wherein m is an integer from 1 through 4, n is an integer from 0 through 3; and wherein a, b, c and d are independently either 0 or 1. The present invention also relates to methods of preparing and using the inventive construction materials.

BACKGROUND OF THE INVENTION

The oil industry generates a large amount of oil-containing waste that is costly to remediate or dispose of. Space available for landfills is dwindling, and sensitivity towards the environmental impacts of waste disposal is increasing. Thus, new uses for oil-containing waste are being explored as an alternative to expensive waste management.

Several options for using oil-containing beach sand are described in "Deepwater Horizon Oil Spill Response Treatment, Reuse and Disposal Options," published by the Department of Environmental Protection (DEP) Northwest District on May 19, 2010. The DEP publication describes using viscous oil-containing beach sand directly in a process to produce new road surfacing material. The DEP publication also describes combining oily, less viscous crude washed ashore with beach sand to produce a "clinker," which is then ground and used as cement. However, applications utilizing reclaimed oil or oil-containing material are still limited.

In addition to the above examples, oil-containing material may be used as filler in construction material compositions. However, simply combining oil-containing filler with conventional binders may, for example, inadequately incorporate oil in the construction material, resulting in poor mechanical properties and materials that may also leach oil. In particular, the use of water in some construction material applications, such as in cement for making concrete, renders oil-containing fillers less useful because the oil may be incompatible with water. Therefore, it is desirable to produce construction material compositions capable of utilizing oil-containing fillers in which the oil is stable in the final composition and does not leach, the odor of the oil is minimal, and the desired mechanical properties of the construction material are maintained or improved.

SUMMARY OF THE INVENTION

In one embodiment, the invention encompasses a construction material comprising at least one binder, at least one oil-containing filler and at least one metallate additive according to formula (1) given above.

In an alternative embodiment, the invention encompasses construction material compositions wherein at least one metallate additive is selected from the group consisting of LICA® 01, LICA® 09, LICA® 12, LICA® 38, LICA® 38J, LICA® 44, LICA® 97, KR® TTS, KR® 38S, KR® 41B, KR® 44, KR® 55, KR® 9S, KR® 138S, KR® 138J, KR® 238S, KR® 238J, NZ® 12, NZ® 38, NZ® 97, NZ® 37, KZ® TPP and KS™ N 60S. More preferably, the at least one metallate additive is LICA® 09, or KR® 44 or a combination thereof.

In an alternative embodiment, the invention encompasses construction material compositions wherein the at least one metallate additive is in the form an aqueous emulsion or an aqueous solution. More preferably, the metallate additive containing aqueous emulsion or aqueous solution further comprises a surfactant.

In an alternative embodiment, the invention encompasses construction material compositions comprising a first and a second metallate additive. Preferably, the first metallate additive is hydrophilic and the second metallate additive is hydrophobic.

In an alternative embodiment, the invention encompasses methods of using the inventive construction material as an asphalt, asphalt emulsion, cement, concrete, polymer modified concrete, polyurethane composite, mortar, stucco, grout, coating, insulation, surfacing material, sub-roofing fill, decking sheet, roofing shingle, insulation sheet, siding, sealant adhesive or the like.

In an alternative embodiment, the invention encompasses construction material compositions wherein at least one binder is selected from the group consisting of cement, asphalt, and polymeric material. Preferably, the polymeric material is a curable resin. More preferably, the curable resin is a two component epoxy resin/hardener system.

In an alternative embodiment, the invention encompasses construction material compositions wherein at least one oil-containing filler contains oil, for example, in the range from about 1% to about 10% by weight of filler.

In an alternative embodiment, the invention encompasses construction material compositions wherein the at least one oil-containing filler is primarily sand. Preferably, at least one oil-containing filler is derived from an oil spill, at least one binder is cement and an oil-containing filler to binder mass ratio is about 2:1.

In an alternative embodiment, the invention encompasses construction material compositions wherein the at least one oil-containing filler is primarily at least one of barium sulfate and calcium sulfate. More preferably, the at least one oil-containing filler comprises waste drilling mud, the at least one binder is cement and an oil-containing filler to binder mass ratio is about 3:1.

In an alternative embodiment, the invention encompasses a method of making a construction material by combining at least one binder, at least one oil-containing filler and at least one metallate additive according to formula (1).

In another embodiment, the invention encompasses a method of making a construction material wherein the first metallate additive is in the form an aqueous emulsion or an aqueous solution. Preferably, the aqueous emulsion or the aqueous solution further comprises a surfactant.

In an alternative embodiment, the invention encompasses a method of making a construction material further comprising the steps of combining a second metallate additive after at least one binder, at least one oil-containing filler and at least one metallate additive have already been combined.

In an alternative embodiment, the invention encompasses a method of making a construction material wherein the first metallate additive is in the range of about 0.3 to about 0.9% by weight, preferably about 0.6% by weight of the combined mass of the binder and the oil-containing filler. The second metallate additive is in the range of about 0.1% to about 0.7% by weight, preferably about 0.4% of the combined mass of the binder and the oil-containing filler.

In an alternative embodiment, the invention encompasses a method of making a construction material wherein the binder is cement, and at least a first metallate additive has a pH of at least about 7.

In an alternative embodiment, the invention encompasses a method of making a construction material further comprising the steps of combining a resin component of a curable resin after at least one binder, at least one oil-containing filler and at least one metallate additive have been combined. Then a second metallate additive is combined, followed by the addition of a hardening component of the curable resin. Preferably at least one binder is one of an asphalt and a cement.

In an alternative embodiment, the invention encompasses a construction material made by combining at least one binder, at least one oil-containing filler and at least one metallate additive according to formula (1).

In an alternative embodiment, the invention encompasses construction material compositions wherein the construction material is one of an asphalt, asphalt emulsion, cement, concrete, polymer modified concrete, polyurethane composite, mortar, stucco, grout, coating, insulation, surfacing material, sub-roofing fill, decking sheet, roofing shingle, insulation sheet, siding, sealant adhesive, or the like.

DETAILED DESCRIPTION OF THE INVENTION

Figure 1:
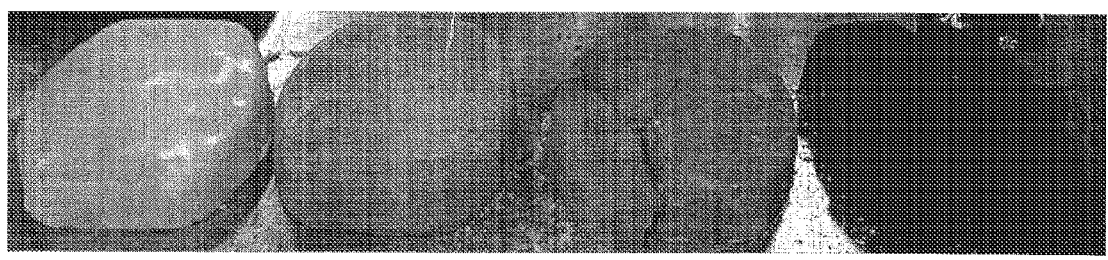
FIG. 1. The photograph illustrates a gradient of cured slab quality. The slabs are formed from a mold about 1 inch deep, about 32 square inches. Sample A corresponds to a sample having excellent homogeneity and strength with no water and/or oil separation. Sample D corresponds to an inadequate concrete slab with poor homogeneity and strength and with possible oil and/or water separation. Samples B and C represent intermediate quality slabs.

As used herein, the term "construction material" means any of a variety of materials that may be used in construction projects, for example, in constructing buildings, homes, bridges or other structures as well as surfaces such as highways, roads, landing strips, sidewalks, playgrounds, or beds for such surfaces, for example an asphalt, asphalt emulsion, cement, concrete, polymer modified concrete, polyurethane composite, mortar, stucco, grout, coating, insulation, surfacing material, sub-roofing fill, decking sheet, roofing shingle, insulation sheet, siding, sealant, adhesive and the like.

As used herein, the term "binder" means any of a variety of materials that may be used to impart adhesion and that binds a construction material together. The binders of the invention depend on the desired property of the inventive construction material and may include, for example, cement, asphalt, polymeric materials and the like.

Examples of cements that may be suitable for use as binders in the present invention are not particularly limited and include: Quikrete™ No. 1103 (mixture of portland cement CAS #65997-15-1, lime CAS #01305-62-0, crystalline silica sand, CAS #14808-60-7 and may contain one or more of: alumina CAS #01344-28-1, limestone dust CAS #01317-65-3, and calcium sulfate CAS #10101-41-4); and Lafarge™ portland cement Type 1/11 (mixture of portland cement CAS #65997-15-1, calcium sulfate CAS #13397-24-5, calcium carbonate CAS #1317-65-3, calcium oxide CAS #1305-78-8, magnesium oxide CAS #1309-48-4, crystalline silica CAS #14808-60-7).

Examples of asphalts that may be suitable for use as binders in the present invention are not particularly limited and include: Latex•ite™ Trowel Patch, Blacktop Crack Fill, (asphalt—CAS #8052-42-4, crystalline silica—CAS #14808-60-7, clay—CAS #1332-58-7 and water); and Latex•ite™ 2X crack filler (an acrylic latex rubber and vinyl polymer blend also comprising: asphalt—CAS #8052-42-4 and clay—CAS #1332-58-7). Typically, asphalts may be comprised of residue from petroleum refining. However, they may also be produced from a selected crude oil blend and processed to an appropriate grade.

Examples of polymeric materials that may be suitable for use as binders in the present invention are not particularly limited and include: curable resins such as epoxy resin/hardener systems, acrylic latex, rubber, vinyl, neoprene latex, water based epoxy, water based polyurethane, fluorocarbons, modified phenylene oxides, nylons, polyethylene terephthalate, polybutylene, terephthalate, phenolics, polyamides, polycarbonates, polyetheretherketones, polyaryletherketones, polyether imides, polyphenylene sulfides, polysulfones, polyarylsulfones, styrene, polyester copolymers, styrenics, such as, polystyreneacrylonitrile-butadiene-styrene, styrene-acrylonitrile, styrene-butadiene, and styrene-maleic anhydride copolymers and the like. An example of a two component resin system compatible with the present invention may be NuPrime™ epoxy, a general purpose polyamide epoxy.

As used herein, the term "filler" generally refers to particles that are added to a binder to lower the consumption of more expensive binder material and/or to improve some properties of the resulting composition. Unless otherwise specified, the term "filler" means any inorganic or organic solid form of particle, particulate, aggregate, colloid or fiber that is not a binder material. The term "primarily composed of,"

unless stated otherwise is used to refer to a component having a largest proportion of a composition. The size of the particles that make up the filler of the present invention depends on the composition being prepared and physical properties desired.

Examples of filler that may be suitable for use in the present invention are not particularly limited and include: silicates, carbonates, sulfates, oxides or hydroxides which may or may not have a stoichiometric amount of a metal such as Na, Mg, Zn, Al, Ca, Ba and Fe; clays such as bentonites, kaolinites; aggregates such as sand, gravel, crushed stone, slag; minerals such as gypsum, borate, potash, vermiculite, flyash; organic materials such as acetates, nitrates, nitramines, aramid fibers, organic pigments, cellulosics, carbon black, carbon fibers, nylon fibers, polytetrafluoroethylene, graphite and the like, as well as vegetation or other organic debris, such as straw, sawgrass, weeds, small organisms such as insects, and the like.

The oil-containing filler to binder mass ratio depends on the composition being prepared and physical properties desired, and in general may be from about 10:1 to about 1:1. Preferably, the oil-containing filler to binder mass ratio may be from about 4:1 to about 1:1. More preferably, the oil-containing filler to binder mass ratio may be from about 3:1 to about 2:1. In an embodiment, the binder may be cement and the oil-containing filler may be either Ba and/or Ca sulfate, and the oil-containing filler to binder mass ratio may be about 3:1. In an additional embodiment, the binder may be cement and the oil-containing filler may be sand, and the oil-containing filler to binder mass ratio may be about 2:1. It is understood by practitioners in the art that fillers having a smaller particle size generally have greater surface area by weight and thus may require more solvent and/or binder to achieve the desired characteristics, such as viscosity, and flowability, of the composition. It is also understood by practitioners in the art that fillers may have a distribution of various particle sizes that creates a micropacking effect thus minimizing binder demand to achieve the desired characteristics, such as viscosity, and flowability, of the composition.

As used herein, the term "oil," unless otherwise specified, generally refers to a variety of liquid or easily liquefiable, combustible substances that may be soluble in ether but not very soluble in water. The oil of the present invention is not particularly limited and includes, for example animal, vegetable, fossil and synthetic oils. Preferably the term "oil" may refer to petroleum or petroleum based oil that may be either crude oil, or oil at any stage of refinement. The oil may contain any combination of hydrocarbons, for example, paraffins, olefins, naphthenes, anthracenes, and high-boiling aromatics.

Unless otherwise specified, any amount given in terms of a percent is meant to be a percent by weight.

As used herein, the term "oil-containing filler" means that the filler contains at least some amount of oil. An oil-containing filler of the present invention preferably contains at least about 1% oil by weight of filler. In one embodiment, the filler is "saturated" with oil. The term "saturated" when used to refer to oil saturated filler means the amount of oil that remains after oil is combined with wet filler and has been allowed to drain away from the filler. More preferably, an oil-containing filler contains oil in the range from about 1% to about 10% by weight of filler; most preferably in the range from about 3% by weight of filler to about 5% by weight of filler.

Material derived from the site of an oil spill is particularly well suited for use as an oil-containing filler in the inventive compositions. For example, oily debris, tar balls, tar patties, mousse oil, crude oil spill cleanup generated waste, and other petroleum waste products may be suitable. Oil-containing fillers derived from an oil spill site may also contain sand, shell pieces, salt and water. Oil-containing fillers derived from an oil spill site may further contain vegetation or other organic debris from the environment. Oil-containing fillers derived from an oil spill site may also include any chemical additives applied during efforts to control the oil spill such as, but not limited to, emulsifiers, surfactants, wetting agents and dispersants.

Drilling mud or drilling fluid as it is commonly called, is also particularly well suited for use as an oil-containing filler in the inventive compositions. Drilling fluids may typically be composed of water, petroleum oils, other organic liquids, dissolved inorganic and organic additives, and suspended finely divided particles of various types. Drilling muds may also contain, for example, oil, seawater, silt, barite, clay minerals, starch, carboxycellulosics and polyacrylamide derivatives. In an embodiment, the drilling mud for use in the present invention may have previously been used in a drilling process and may be referred to as "waste drilling mud." In another embodiment, other fillers that are not oil-containing may be added to waste drilling mud in order to adjust the percent of oil in the waste drilling mud for use in the present invention. For example, barium sulfate and/or calcium sulfate in the form of a dry powder may be added in order to adjust the percent oil in the filler to be about 10% by weight or less.

Examples of drilling muds that may be suitable for use in the present invention are not particularly limited and include Halliburton—Accolade™ system—16.2 ppg—GOM—Ester/Olefin Base oil (mixture of: 30% to 60% barium sulfate CAS #7727-43-7; 1-5% crystalline silica, quartz CAS #14808-60-7; 1-5% calcium chloride CAS #10043-52-4; 0-1% crystalline silica, tridymite CAS#15468-32-3; 1-5% olefins, 0-1% crystalline silica, crystobalite CAS #14464-46-1); and Halliburton—Intergrade™ System—14.65 ppg—5 Texas Diesel Base Oil (mixture of: 30% to 60% barium sulfate CAS #7727-43-7, 30% to 60% Diesel CAS #68476-34-6, and crystalline silica CAS #14808-60-7).

As used herein, the term "metallate additive" generally refers to an additive useful in the present invention that may be generally represented by formula (1), given above. The scope of acceptable metallate additives may be further understood by referring to the lists of exemplary metallate additives according to formula (1) provided below.

| Type of metallate additive where M = Ti or Zr | (1) $(RO)_m$—M—$(O_a$—$X_b$—$R'_c$—$Y_d)_n$ |
| --- | --- |
| Monoalkoxy type | m = 1, n = 3 |
| Coordinate type | m = 4, n = 2 |
| Chelate type | m = 1, n = 2 or 3 |
| Quat type | m = 1, n = 2 or 3 adduct with an amino functional moiety |
| Neoalkoxy type | m = 1, n = 3 |
| Cycloheteroatom type | m = 1, n = 1 |

Examples of metallate additives according to formula (1) in which m=1, n=3 may include monoalkoxy titanates and/or zirconates, for example, titanium IV 2-propanolato, tris isooctadecanoato-O; titanium IV bis 2-methyl-2-propenoato-O, isooctadecanoato-O 2-propanolato; titanium IV 2-propanolato, tris(dodecyl)benzenesulfanato-O; titanium IV 2-propanolato, tris(dioctyl)phosphato-O; titanium IV (4-amino)benzene sulfonato-O, bis(dodecyl)benzene sulfonato-O, 2-propanolato; titanium IV, tris(2-methyl)-2-propenolato-O, methoxydiglycolylato; titanium IV 2-propanolato, tris(dioctyl)pyrophosphato-O; titanium IV, tris(2-propenolato-O), methoxydiglycolylato-O; and titanium IV 2-propanolato, tris(3,6-diaza)hexanolato.

Examples of metallate additives according to formula (1) in which m=1, n=3 may include neoalkoxy titanates and zirconates, for example: titanium IV 2,2(bis 2-propenolatomethyl)butanolato; tris neodecanoato-O; titanium IV 2,2(bis 2-propenolatomethyl)butanolato; tris(dodecyl)benzenesulfonato-O; titanium IV 2,2(bis 2-propenolatomethyl)butanolato; tris(dioctyl)phosphato-O; titanium IV 2,2(bis 2-propenolatomethyl)butanolato; tris(dioctyl)pyrophosphato-O; titanium IV 2,2(bis 2-propenolatomethyl)butanolato; tris(2-ethylenediamino)ethylato; titanium IV 2,2(bis 2-propenolatomethyl)butanolato; tris(3-amino)phenylato; titanium IV 2,2(bis 2-propenolatomethyl)butanolato; tris(6-hydroxy)hexanoato-O, zirconium IV 2,2(bis-2-propenolatomethyl)butanolato; tris neodecanolato-O; zirconium IV 2,2(bis-2-propenolatomethyl)butanolato; tris(dodecyl)benzenesulfonato-O; zirconium IV 2,2(bis-2-propenolatomethyl)butanolato; tris(dioctyl)phosphato-O; zirconium IV 2,2(bis-2-propenolatomethyl)butanolato; tris 2-methyl-2-propenolato-O; zirconium IV 2,2(bis-2-propenolatomethyl)butanolato; tris(dioctyl)pyrophosphato-O; zirconium IV 2,2(bis-2-propenolato)butanolato; tris 2-propenoato-O; zirconium IV 2,2(bis-2-propenolatomethyl)butanolato; tris (2-ethylenediamino)ethylato; zirconium IV his 2,2(bis-2-propenolatomethyl)butanolato; bis(para amino benzoato-O); zirconium IV his 2,2(bis-2-propenolatomethyl)butanolato; bis(3-mercapto)propionato-O; zirconium IV 1,1(bis-2-propenolatomethyl)butanolato; and tris(2-amino)phenylato.

Examples of metallate additives according to formula (1) in which m=1, n=1 may include cycloheteroatom titanates and zirconates, for example: titanium IV bis-octanolato; cyclo(dioctyl)pyrophosphato-O,O; titanium IV his cyclo (dioctyl)pyrophosphato-O,O; zirconium IV 2-ethyl, 2-propenolatomethyl 1,3-propanediolato, cyclo di 2,2-(bis 2-propenolatomethyl) butanolato pyrophosphato-O,O; and zirconium IV his 2-ethylhexanolato, cyclo(di 2-ethylhexyl) pyrophosphato-O,O.

Examples of metallate additives according to formula (1) in which m=4, n=2 may include coordinate titanates and zirconates, for example: titanium IV tetrakis 2-propanolato, adduct 2 moles (dioctyl)hydrogen phosphate; titanium IV tetrakis octanolato adduct 2 moles (di-tridecyl)hydrogen phosphite; titanium IV tetrakis(bis 2-propenolato methyl)-1-butanolato, adduct 2 moles (di-tridecyl)hydrogen phosphite; and zirconium IV tetrakis 2,2(bis-2 propenolatomethyl)butanolato; adduct with 2 moles of di-tridecyl, hydrogen phosphite.

Examples of metallate additives according to formula (1) in which m=1, n=3 may include quat titanates and/or zirconates, for example: titanium IV bis(dioctyl)pyrophosphato-O, oxoethylenediolato, (adduct) 2 moles of 2-N,N-dimethylamino-2-methylpropanol; titanium IV bis(butyl methyl)pyrophosphato-O, (adduct) 2 moles 2-N,N-dimethylamino-2-methylpropanol; titanium IV ethylenediolato, bis(dioctyl) pyrophosphato-O, bis(triethyl)amine salt; titanium IV ethylenediolato bis(dioctyl)pyrophosphato-O, bis(dialkyl) amino alkyl-2-methyl propenoate; titanium IV bis(dioctyl)pyrophosphato-O, ethylenediolato, (adduct) 2 moles of acrylato-O active amine; titanium IV bis(dioctyl)pyrophosphato-O, ethylenediolato, (adduct) 2 moles of 2-methylpropenoamido-N active amine; titanium IV bis(butyl, methyl)pyrophosphato, ethylenediolato, bis(dialkyl) amino alkyl acrylate salt; titanium IV (bis-2-propenolato-methyl)-1-butanolato, bis(dioctyl) pyrophosphato-O, (adduct) 3 moles N,N-dimethylamino-alkyl propenoamide; zirconium IV 2,2-dimethyl 1,3 propanediolato, bis(dioctyl) pyrophosphato-O, (adduct) 2 moles N,N-dimethylamino-alkyl propenoamide; zirconium IV (2-ethyl, 2-propenolatomethyl)1,3-propanediolato, cyclo his 2-dimethylamino pyrophosphato-O, adduct with 2 moles of methanesulfonic acid, Quat Blend of 1 part LICA 38J and 2 parts NZ 38J, Quat Blends of titanate and zirconate quats.

Examples of metallate additives according to formula (1) in which m=1, n=2 or 3 may include chelate type titanates and zirconates, for example, titanium IV bis[4-(2-phenyl)-2-propyl-2]phenolato, oxoethylenediolato; titanium IV bis(dioctyl)pyrophosphato-O, oxoethylenediolato, (adduct), (dioctyl) (hydrogen)phosphite-O; titanium IV oxoethylenediolato, tris(2-methyl)-2-propenoato-O; and titanium IV bis(butyl, methyl)pyrophosphato-O, oxoethylenediolato, (adduct), bis(dioctyl)hydrogen phosphite.

Examples of metallate additives according to formula (1) in which m=1, n=2 or 3 may include A, B ethylene chelate titanates and zirconates, for example, titanium IV bis(dioctyl) phosphato-O, ethylenediolato; titanium IV bis(dioctyl)pyrophosphato-O, ethylenediolato (adduct); bis(dioctyl)hydrogen phosphite; and titanium IV bis(butyl, methyl) pyrophosphato-O, ethylenediolato, (adduct), bis(dioctyl) hydrogen phosphite.

Preferably, the metallate additive may be one of LICA® 01 (chemical name—titanium IV 2,2(bis 2-propenolatomethyl) butanolato, tris neodecanoato-O, CAS #103334-85-6), LICA® 09 (chemical name—titanium IV 2,2(bis 2-propenolatomethyl)butanolato, tris(dodecyl)benzenesulfonato-O, CAS #103406-74-2), LICA® 12 (chemical name—titanium IV 2,2(bis 2-propenolatomethyl)butanolato, tris(dioctyl) phosphato-O, CAS #110438-25-0), LICA® 38, (chemical name—titanium IV 2,2 (bis 2-propenolatomethyl)butanolato, tris(dioctyl) pyrophosphato-O, CAS #103432-54-8), LICA® 38J (chemical name—titanium IV (bis-2-propenolatomethyl)butanolato, bis(dioctyl) pyrophosphato-O, (adduct) 3 moles N,N-dimethylamino-alkyl propenoamide, CAS #117002-37-6), LICA® 44 (chemical name—titanium IV 2,2 (bis 2-propenolatomethyl)butanolato, tris(2-ethylenediamino) ethylato, CAS #107541-22-0), LICA® 97 (titanium IV 2,2(bis 2-propenolatomethyl)butanolato, tris(3-amino) phenylato, CAS #107525-86-0), KR® TTS (chemical name—titanium IV 2-propanolato, tris isooctadecanoato-O, CAS #61417-49-0), KR® 41B (chemical name—titanium IV tetrakis 2-propanolato, adduct 2 moles (dioctyl)hydrogen phosphate), CAS #68585-67-1), KR® 44 (chemical name—titanium IV, tris[2-[(2-aminoethyl)amino]ethanolato-O], 2-propanolato, CAS #65380-84-9), KR® 55 (chemical name—titanium IV tetrakis(bis 2-propenolato methyl)-1-butanolato adduct 2 moles (di-tridecyl)hydrogen phosphite), CAS #64157-14-8), KR® 9S (chemical name—titanium IV, 2-propanolato, tris(dodecyl)benzenesulfonato-O, CAS #61417-55-8), KR® 138D (chemical name—titanium IV bis (dioctyl)pyrophosphato-O, oxoethylenediolato, (adduct) 2 moles of 2-N,N-dimethylamino-2-methylpropanol), CAS #68585-64-8), KR® 138S, (chemical name—titanium IV bis (dioctyl)pyrophosphato-O, oxoethylenediolato, (adduct), bis (dioctyl) (hydrogen)phosphite, CAS #68585-64-8), and KR® 238S (chemical name—titanium IV bis(dioctyl)pyrophosphato-O, ethylenediolato (adduct), bis(dioctyl) (hydrogen)phosphite, CAS #68585-63-7), KR® 238J (chemical name—titanium IV bis(dioctyl)pyrophosphato-O, ethylenediolato, (adduct) 2 moles of 2-methylpropenoamido-N active amine, CAS #198840-66-3), KR® 38S, (chemical name—titanium IV 2-propanolato, tris(dioctyl)pyrophosphato-O, CAS #68585-78-4), NZ® 12 (chemical name Zirconium IV 2,2(bis-2-propenolatomethyl)butanolato, tris(dioctyl)phosphato-O, CAS #117101-65-2), NZ® 38 (chemical name—zirconium IV 2,2(bis-2-propenolatomethyl)butanolato, tris (dioctyl)pyrophosphato-O, CAS #113252-64-5), NZ® 97 (chemical name—zirconium IV 1,1(bis-2-propenolatomethyl)butanolato, tris(2-amino)phenylato, CAS #111083-78-4), NZ® 37 (chemical name—zirconium IV his 2,2(bis-2-propenolatomethyl)butanolato, bis(para amino benzoato-O, CAS #146955-66-0), KZ® TPP (chemical name—zirconium IV 2-ethyl, 2-propenolatomethyl 1,3-propanediolato, cyclo di 2,2-(bis 2-propenolatomethyl) butanolato pyrophosphato-O,O, CAS #121543-39-3), and combinations thereof, obtainable from Kenrich Petrochemicals Inc, Bayonne, N.J. Also, KS™ N 60S may also be used as a metallate additive of the present invention, obtainable from Kenrich Petrochemicals Inc, Bayonne, N.J.

A metallate additive according to formula (1) may be in the form of a liquid or solid, e.g., a powder or a pellet. A metallate additive according to formula (1) may be in a water based or organic based formulation. A metallate additive according to formula (1) for use in a water based formulation is preferably water miscible or water emulsifiable. A water based formulation is preferably an emulsion or an aqueous solution and may also comprise at least one surfactant. A surfactant is a material that may lower the surface tension of a liquid, allowing easier spreading, and lowering of the interfacial tension between two liquids, or between a liquid and a solid. As a person of ordinary skill in the art would understand, a combination of water and a metallate additive according to formula (1) may need to be blended under high shear in order to form an emulsion. It is preferable that a 5% solution of a metallate additive according to formula (1) in water, optionally including a surfactant, results in a clear solution.

Examples of surfactants compatible with the present invention include polyethylene glycol 300 (PEG), ethoxylated nonyl phenol, Triton X-100® octoxynol-9 (CAS 9002-93-1), Surfadone® LP-300 and LP-100, Surfonic® OP-70 and OP-100, dimethylaminopropyl methacrylamide (DMAPMA), dimethylaminoethoxy ethanol, calcium alkylaryl sulfonate, sorbitan monooleate, sorbitan monolaurate, sorbitan trioleate, sorbitan stearate, sorbitan palmate, polyethylene glycol monooleate, sodium dodecylbenzene sulfonate (anionic), dodecylbenzene sulfonic acid, ammonium alcohol ethoxylate sulfate, sodium alkylaryl sulfonate, phosphate ester and the like, and combinations thereof. Surfactants may also include those materials formed by the process of ethoxylation in which ethylene oxide is added to fatty acid alcohols to give them detergent properties, for example, secondary alcohol ethoxylate sold under the brand name Tergitol™ 15-S-9 (CAS 68131-40-8).

The ratio of metallate additive to surfactant depends on the composition being prepared and properties desired and in general is in the range (by mass) from about 1:10 to about 10:1, preferably, from about 5:1 to about 1:5, most preferably, about 1:3. Examples include a 1:3 ratio of LICA® 09 to Tergitol® 15-S-9; a 1:2:1 blend of LICA® 09 to Tergitol® to PEG 300; and a 1:3 ratio of KR® 44 to PEG 300.

The construction materials of the present invention may include multiple metallate additives according to formula (1), for example, a first and a second, etc., metallate additive according to formula (1). In an embodiment of the invention the first and second metallate additives according to formula (1) are added to the inventive composition in separate process steps. In another embodiment of an inventive construction material having multiple metallate additives according to formula (1), the first and second metallate additives according to formula (1) are added to the inventive composition in the same process step. In a further embodiment, the first and second metallate additives according to formula (1) are combined in an aqueous or organic formulation that is added to the inventive composition in a single step.

As used herein, the term "combine" generally refers to adding two or more components together, for example by placing the components in a vessel and mixing, blending, stirring, homogenizing, and/or emulsifying the composition.

In an embodiment, the construction material of the present invention is used as a concrete; the inventive construction material comprising a binder, an oil-containing filler, and at least one metallate additive according to formula (1); wherein the binder is a cement and wherein the oil-containing filler is, for example, beach sand or waste drilling mud. A first metallate additive according to formula (1) may be hydrophilic and preferably in the form of an aqueous solution. Preferably, the first metallate additive according to formula (1) is KR® 44. The inventive composition optionally further comprises a second metallate additive according to formula (1), wherein the first metallate additive according to formula (1) is hydrophilic and the second metallate additive according to formula (1) is hydrophobic. Preferably, the second metallate additive according to formula (1) is LICA® 09. In a preferred embodiment, the second metallate additive according to formula (1) is added after the combination of cement, oil-containing filler, and the first metallate additive according to formula (1). The first metallate additive according to formula (1) is preferably about 0.6% by weight of a combined mass of the binder and the oil-containing filler; the second metallate according to formula (1) is preferably about 0.4% by weight of the combined mass of the binder and oil-containing filler. The inventive composition preferably further comprises a two component curable resin. Preferably the first component is a resin and the second component is a hardener. The first component is combined after the first metallate additive according to formula (1) is combined with the composition, but before the second metallate additive according to formula (1) is combined with the composition. Then the second component is combined with the composition.

The construction material of the present invention may be used as an asphalt; the inventive construction material comprising a binder, an oil-containing filler, and at least one metallate additive according to formula (1); wherein the binder is an asphalt, and optionally, a second binder is cement and wherein the oil-containing filler is beach sand or waste drilling mud. A first metallate additive according to formula (1) may be hydrophilic and preferably is in the form of an aqueous solution. Preferably, the first metallate additive according to formula (1) is KR® 44. The inventive composition optionally further comprises a second metallate additive according to formula (1), wherein the first metallate additive according to formula (1) is hydrophilic and the second metallate additive according to formula (1) is hydrophobic. Preferably, the second metallate additive according to formula (1) is LICA® 09. In a preferred embodiment, the second metallate additive according to formula (1) is added after the combination of asphalt, oil-containing sand, and the first metallate additive according to formula (1). The first metallate additive according to formula (1) is preferably about 0.6% of a combined mass of the binder and the oil-containing filler; the second metallate according to formula (I) is preferably about 0.4% of the combined mass of the binder and the oil-containing filler. The inventive compositions preferably further comprise a two component curable resin. Preferably the first component is a resin and the second component is a hardener. The first component is combined after the first metallate additive according to formula (1) is combined with the composition, but before the second metallate additive according to formula (1) is combined with the composition. Then the second component is combined with the composition.

EXAMPLES

In the following examples, water saturated, oil-containing beach sand was prepared by weighing an amount of seawater wet beach sand dug from a site located at the shoreline formed by the intersection of the Atlantic Ocean and the South Beach, Staten Island, N.Y., and then draining the saltwater from the thus obtained beach sand. The saltwater drained beach sand was then combined with No. 4 fuel oil. No. 4 oil is typically a blend of distillate and residual fuel oils, such as No. 2 and No. 6 oils; however, sometimes No. 4 oil is a heavy distillate. No. 4 oil may be classified as diesel, distillate or residual fuel oil. This composition was used to simulate oil soaked beach sand derived from an oil spill site. A person of ordinary skill in the art would understand that different types of beach sand with varying amounts of water and oil, as well as varying kinds of oil, would fall within the scope of the present invention.

The drilling mud used in the following examples, unless otherwise specified, was made from the combination of 15 grams of No. 4 oil, 0.13 grams of water, 5 grams of aminoethanolamine, 5.3 grams of polyoxyethylene (20) sorbitan monooleate, 3.6 grams of CaO or $CaCO_3$ (3 micron), 14.74 grams of $CaCl_2$ (DowFlake™ Xtra), 4 grams of calcined clay (Burgess™ KE clay), 0.68 grams of fumed silica (Cab-O-Sil® M-5), and 513 grams of $BaSO_4$, in accordance with conventional drilling mud formulations. This composition was used to simulate waste drilling mud. A person of ordinary skill in the art would understand that different types of drilling fluid compositions would fall within the scope of the present invention.

The inventive construction materials of the present invention in general have good homogeneity with minimal separation of oil and/or water and have comparable or improved strength compared to conventional materials.

Compression tests were conducted using a PHI® Hydraulic Press, Model P-2150, Serial #74-10-008. Ram Force read in Pounds—4-inch diameter ram—4,000 lb tube. A standard beam test with the specimens subjected to direct compression and shear forces devoid of tension forces since most cementitious compositions' tensile strengths (absent steel rebar reinforcement) are about 10% of their corresponding compression strengths. The beam test was conducted using a steel pipe having a about a 2" inside diameter and about 2.4" outside diameter placed on top and in the center of a test slab of the construction material (formed from a mold about 1 inch deep, about 32 square inches) and compressed in accordance with ASTM C31 *Standard Practice for Making and Curing Concrete Test Specimens in the Field*. The pressure at which the slab cracks is characteristic of the strength of the slab.

Example No. 1

333 g of cement (Lafarge™ Type 1/11), 667 grams of beach sand (water saturated), 35 grams of No. 4 oil, and 50 grams of tap water were combined. A metallate additive according to formula (1) made up of 4.14 grams of KR® 44 diluted in 20.7 grams of tap water was then slowly added to the cement/sand/oil composition. The obtained composition was then poured into a mold (about 1 inch deep, about 32 square inches) and allowed to cure. The resulting concrete slab is characterized as a type A slab.

Example No. 2

333 g of cement (Lafarge™ Type 1/11), 667 grams of beach sand (water saturated), and 35 grams of No. 4 oil were combined. A first metallate additive according to formula (1) made up of 4.14 grams of KR® 44 diluted in 50 grams of tap water was then slowly combined with the cement/sand/oil composition. Next, a second metallate additive according to formula (1) made up of 2.07 grams of LICA® 09 diluted in 10.35 g water was added to the composition while stirring. The obtained composition was then poured into a mold (about 1 inch deep, about 32 square inches) and allowed to cure. The resulting concrete slab is characterized as a type A slab.

Comparative Example No. 3

333 g of cement (Lafarge™ Type 1/11), 667 grams of beach sand (water saturated), 35 grams of No. 4 oil, and 50 grams of tap water were combined. The obtained composition was then poured into a mold (about 1 inch deep, about 32 square inches) and allowed to cure. The resulting concrete slab is characterized as a type B slab.

Example No. 4

Figure 2:
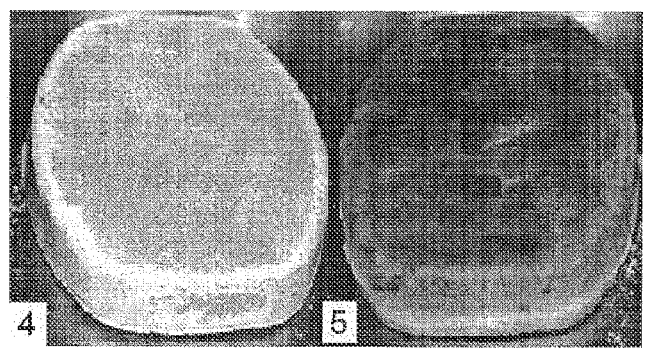
FIG. 2. Representative concrete slabs produced by example 4 and comparative example 5.
Figure 3:
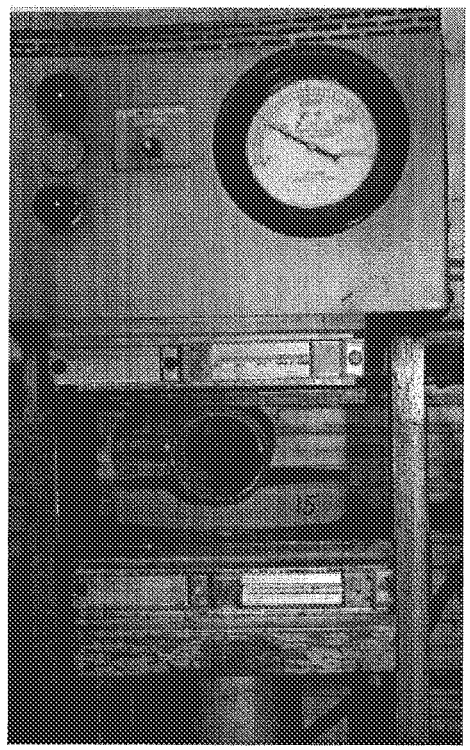
FIG. 3. Photograph of a compression test in progress.
Figure 4:
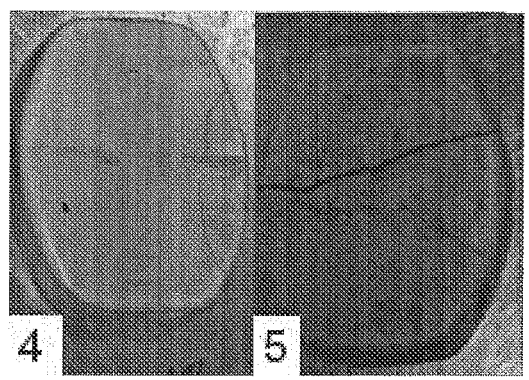
FIG. 4. Representative concrete slabs produced by Examples 4 and 5 after evaluation by a compression test.

333 g of cement (Lafarge™—Type 1/11), 667 grams of beach sand (water saturated), and 35 grams of No. 4 oil were combined. A first metallate additive according to formula (1) made up of 6.21 grams of KR® 44 diluted in 66.67 grams of tap water was then slowly combined with the cement/sand/oil composition. Next, 16.5 grams of a second metallate additive according to formula (1) made up of 25% grams of LICA® 09 and 75% Tergitol® 15-S-9 was then added to the composition while stirring. The composition was then poured into a mold (about 1 inch deep, about 32 square inches) and allowed to cure. The resulting concrete slab is characterized as a type A slab. See FIG. 2. A compression test according to the modified method described above indicated that the slab withstood 10,000 lbs of ram force before cracking. See FIG. 3 and FIG. 4. (Note: The PHI measures Ram Force. Pressure=Ram Force/Area.)

Comparative Example No. 5

333 g of cement (Lafarge—Type 1/11), 667 grams of beach sand (saturated with water), and 35 grams of No. 4 oil were combined. 66.67 grams of tap water was then slowly combined with the cement/sand/oil composition. The composition was then poured into a mold (about 1 inch deep, about 32 square inches) and allowed to cure. The resulting concrete slab is characterized as a type C slab. See FIG. 2. A compression test according to the modified method described above indicated that the slab withstood 9,000 lbs of ram force before cracking. See FIG. 3 and FIG. 4.

Example No. 6

Figure 5:
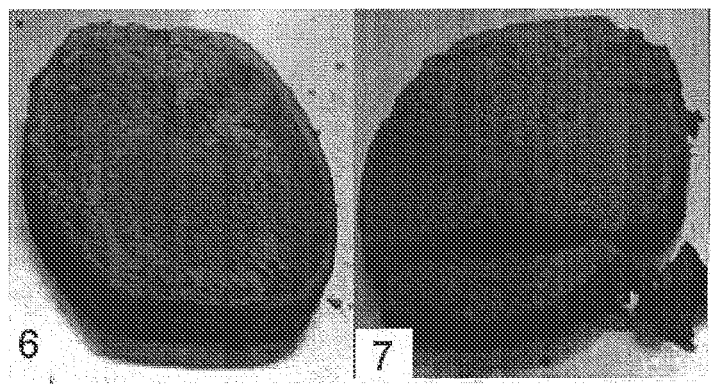
FIG. 5. Representative asphalt slabs produced by example 6 and comparative example 7.

95 grams of beach sand (water saturated), 5 grams of No. 4 oil, 500 grams of asphalt binder (Latex•ite® trowel patch) and a metallate additive according to formula (1) made up of 1.5 grams of KR® 44 were combined. The obtained composition was then poured into a mold (about 1 inch deep, about 32 square inches) and allowed to cure. The resulting asphalt slab is characterized as a type A slab. See FIG. 5.

Comparative Example No. 7

95 grams of beach sand (water saturated), 5 grams of No. 4 oil, 500 grams of asphalt binder (Latex•ite® trowel patch) were combined. The obtained composition was then poured into a mold (about 1 inch deep, about 32 square inches) and allowed to cure. The resulting asphalt slab is characterized as a type C slab. See FIG. 5.

Example No. 8

300 g of cement (Lafarge™—Type 1/11), 900 grams of beach sand (water saturated), 45 grams of No. 4 oil and 300 grams of an asphalt binder (Latex•ite™ 2X Blacktop Crack Filler) were combined. Next, a first metallate additive according to formula (1) made up of 7.2 grams of KR® 44 diluted in 167.2 grams of tap water was slowly combined with the cement/$BaSO_4$/oil composition. Then, a second metallate additive according to formula (1) made up of 1.44 grams of 25% LICA® 09 and 75% Tergitol® 15-S-9 was added to the composition while stirring. The obtained composition was poured into a mold (about 1 inch deep, about 32 square inches) and allowed to cure. The resulting asphalt slab is characterized as a type B slab.

Example No. 9

300 g of cement (Lafarge™—Type 1/11), 900 grams of beach sand (water saturated), 45 grams of No. 4 oil and 300 grams of an asphalt binder (Latex•ite™ 2X Blacktop Crack Filler) were combined. Next, a first metallate additive according to formula (1) made up of 7.2 grams of KR® 44 diluted in 167.2 grams of tap water was slowly combined with the cement/$BaSO_4$/oil composition. A resin part A made up of 12 grams of NuPrime® epoxy resin was then added and blended. A first metallate additive according to formula (1) made up of 1.44 grams of 25% LICA® 09 and 75% Tergitol® 15-S-9 was then added to the composition while stirring. A hardener part B made up of 12 grams of Nuprime® epoxy hardener was then added and blended with the composition. The obtained composition was poured into a mold (about 1 inch deep, about 32 square inches) and allowed to cure. The resulting asphalt slab is characterized as a type A slab.

Example No. 10

Figure 6:
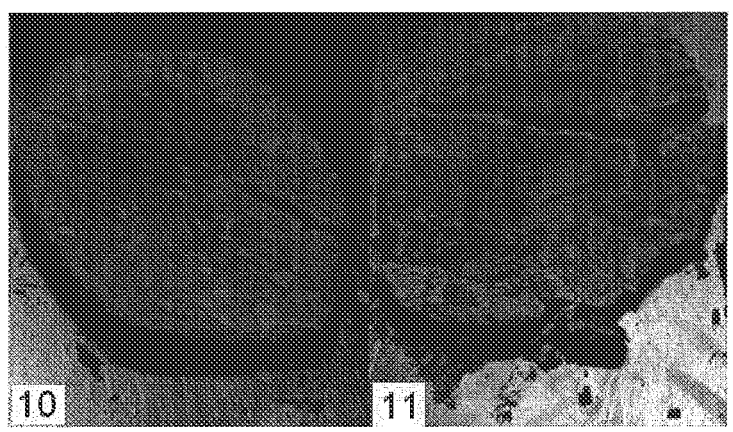
FIG. 6. Representative asphalt slabs produced by example 10 and comparative example 11.

100 g of cement (Lafarge—Type 1/11), 30 grams of water, and 500 grams of drilling mud were combined and blended until smooth. A metallate additive according to formula (1) made up of 1.5 grams of KR® 44 diluted in 6.5 mL water was then slowly added to the cement/drilling mud composition. The obtained composition was poured into a mold (about 1 inch deep, about 32 square inches) and allowed to cure. The resulting concrete slab is characterized as a type A slab. See FIG. 6

Comparative Example No. 11

100 g of cement (Lafarge—Type 1/11), 30 grams of water, and 500 grams of drilling mud were combined and blended until smooth. The obtained composition was poured into a mold (about 1 inch deep, about 32 square inches) and allowed to cure. The resulting concrete slab is characterized as a type A slab. See FIG. 6.

Example No. 12

Figure 7:
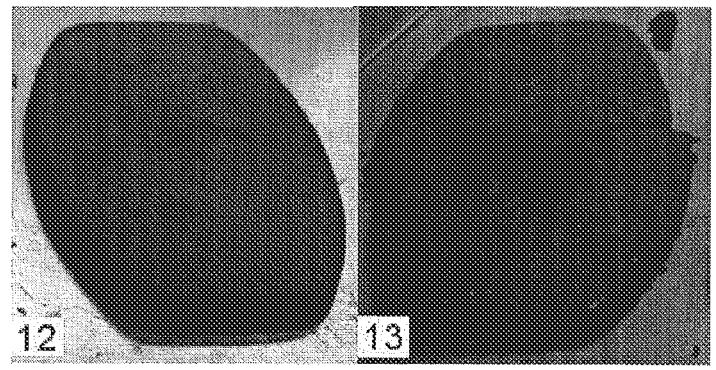
FIG. 7. Representative asphalt slabs produced by example 12 and comparative example 13.

500 grams of drilling mud was combined with 100 grams of an asphalt binder (Latex•ite™ 2X Blacktop Crack Filler) and blended until smooth. Next, a metallate additive according to formula (1) made up of 1.5 grams of KR® 44 was slowly added to the cement/asphalt binder/drilling mud composition while stirring. The obtained composition was poured into a mold (about 1 inch deep, about 32 square inches) and allowed to cure. The resulting asphalt slab is characterized as a type A slab. See FIG. 7

Comparative Example No. 13

500 grams of drilling mud was combined with 100 grams of an asphalt binder (Latex•ite™ 2X Blacktop Crack Filler) and blended until smooth. The obtained composition was poured into a mold (about 1 inch deep, about 32 square inches) and allowed to cure. The resulting asphalt slab is characterized as a type C slab. See FIG. 7.

Example No. 14

1400 grams of $BaSO_4$ powder, 140 grams of No. 4 oil and 467 g of cement (Lafarge—Type 1/11) were combined. A first metallate additive according to formula (1) made up of 7.5 grams of KR® 44 diluted in 250 grams of tap water was then slowly combined with the cement/$BaSO_4$/oil mixture. A second metallate additive according to formula (1) made up of 4.5 grams of 25% LICA® 09 and 75% Tergitol® 15-S-9 was then added to the composition while stirring. The obtained composition was poured into a mold (about 1 inch deep, about 32 square inches) and allowed to cure. The resulting concrete slab is characterized as a type B slab.

Example No. 15

Figure 8:
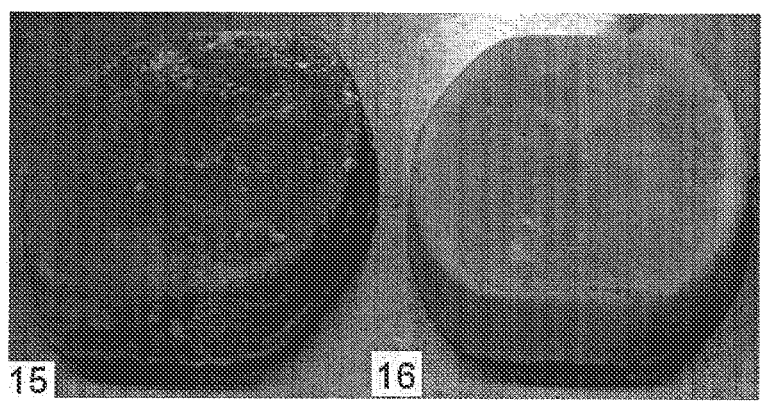
FIG. 8. Representative concrete slabs produced by examples 15 and 16.

1400 grams of $BaSO_4$ powder, 140 grams of No. 4 oil and 467 g of cement (Lafarge—Type 1/11) were combined. A first metallate additive according to formula (1) made up of 7.5 grams of KR® 44 diluted in 250 grams of tap water was then slowly combined with the cement/$BaSO_4$/oil composition. A resin part A made up of 19.3 grams of NuPrime® epoxy resin was then added and blended. Next, a second metallate additive according to formula (1) made up of 4.5 grams of 25% LICA® 09 and 75% Tergitol® 15-S-9 was added to the composition while stirring. Then, a hardener part B made up of 19.3 grams of Nuprime® epoxy hardener was blended with the composition. The obtained composition was poured into a mold (about 1 inch deep, about 32 square inches) and allowed to cure. The resulting concrete slab is characterized as a type B slab. See FIG. 8.

Example No. 16

333 g of cement (Lafarge—Type 1/11), 667 grams of beach sand (water saturated), and 35 grams of No. 4 oil were combined. A first metallate additive according to formula (1) made up of 6.21 grams of KR® 44 diluted in 66.67 grams of tap water was then slowly combined with the cement/sand/oil composition. A resin part A made up of 12 grams of NuPrime® epoxy resin was then added and blended. Next, a second metallate additive according to formula (1) made up of 16.5 grams of 25% LICA® 09 and 75% Tergitol® 15-S-9 was added to the composition while stirring. Then, a hardener part B made up of 12 grams of Nuprime® epoxy hardener was blended with the composition. The obtained composition was poured into a mold (about 1 inch deep, about 32 square inches) and allowed to cure. The resulting concrete slab is characterized as a type A slab. See FIG. 8.

Example No. 17

Figure 9:
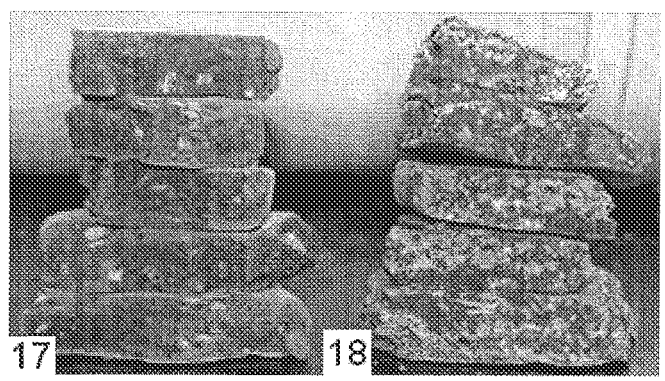
FIG. 9. Comparison of fractured concrete slabs representative of those produced by example 17 and comparative example 18 showing that the oil-containing filler is better dispersed in the inventive product of example 17 than in the comparative product of example 18.

1240 grams of $BaSO_4$ powder, 300 grams of Halliburton Intergrade™ System drilling mud, and 467 g of cement (Lafarge—Type 1/11) were combined. A first metallate additive according to formula (1) made up of 11.2 grams of KR® 44 diluted in 300 grams of tap water was then slowly combined with the cement/BaSO$_4$/drilling mud composition. Then, a second metallate additive according to formula (1) made up of 29.9 grams of 25% LICA® 09 and 75% Tergitol® 15-S-9 was added to the composition while stirring. The obtained composition was poured into a mold (about 1 inch deep, about 32 square inches) and allowed to cure. The resulting concrete slab is characterized as a type B slab. A fractured slab is evaluated to show that the oil-containing filler is better dispersed in the final product than in the comparative example No. 18. See FIG. 9.

Comparative Example No. 18

1240 grams of BaSO$_4$ powder, 300 grams of Halliburton Intergrade™ System drilling mud, and 467 g of cement (Lafarge—Type 1/11) were combined. The obtained composition was poured into a mold (about 1 inch deep, about 32 square inches). The obtained composition was poured into a mold (about 1 inch deep, about 32 square inches) and allowed to cure. The resulting concrete slab is characterized as a type C slab. A fractured slab is evaluated to compare with inventive example No. 17. See FIG. 9.

What is claimed is:

1. A construction material comprising:
   (a) at least one binder;
   (b) at least one oil-containing filler; and
   (c) at least one metallate additive according to formula 1:

$$(RO)_m\text{-}M\text{-}(O_a\text{—}X_b\text{—}R'_c\text{—}Y_d)_n \quad (1)$$

wherein:
   M is one of titanium and zirconium;
   R and R' are independently a monovalent alkyl, alkenyl, alkynyl, aralkyl, aryl or alkaryl group having up to 20 carbon atoms or a halogen or ether substituted derivatives thereof;
   O is oxygen;
   X is selected from the group consisting of carboxyl, alcoholate, sulfonyl, phosphate, pyrophosphate, and phosphite;
   Y is one of a methacrylate, acrylate, mercapto and an amine group;
   m is an integer from 1 through 4; n is an integer from 0 through 3; and a, b, c and d are independently either 0 or 1.

2. The construction material of claim 1, wherein the at least one metallate additive is selected from the group consisting of titanium IV 2,2(bis 2-propenolatomethyl)butanolato, tris neodecanoato-O; titanium IV 2,2 (bis 2-propenolatomethyl) butanolato, tris(dodecyl)benzenesulfonato-O; titanium IV 2,2(bis 2-propenolatomethyl)butanolato, tris(dioctyl)phosphato-O; titanium IV 2,2 (bis 2-propenolatomethyl)butanolato, tris(dioctyl) pyrophosphato-O; titanium IV (bis-2-propenolatomethyl)butanolato, bis(dioctyl) pyrophosphato-O, (adduct) 3 moles N,N-dimethylamino-alkyl propenoamide; titanium IV 2,2 (bis 2-propenolatomethyl)butanolato, tris(2-ethylenediamino) ethylato; titanium IV 2,2(bis 2-propenolatomethyl)butanolato, tris(3-amino)phenylato; titanium IV 2-propanolato, tris isooctadecanoato-O; titanium IV 2-propanolato, tris(dioctyl)phosphato-O; titanium IV tetrakis 2-propanolato, adduct 2 moles (dioctyl)hydrogen phosphate; titanium IV, tris[2-[(2-aminoethyl)amino]ethanolato-O], 2-propanolato; titanium IV tetrakis(bis 2-propenolato methyl)-1-butanolato adduct 2 moles (di-tridecyl)hydrogen phosphite); titanium IV, 2-propanolato, tris(dodecyl)benzenesulfonato-O; titanium IV bis(dioctyl)pyrophosphato-O, oxoethylenediolato, (adduct), bis(dioctyl) (hydrogen)phosphite; titanium IV bis(dioctyl)pyrophosphato-O, ethylenediolato (adduct), bis(dioctyl) (hydrogen)phosphite; titanium IV bis(dioctyl)pyrophosphato-O, ethylenediolato, (adduct) 2 moles of 2-methylpropenoamido-N active amine; zirconium IV 2,2(bis-2-propenolatomethyl)butanolato, tris(dioctyl) phosphato-O; zirconium IV 2,2(bis-2-propenolatomethyl) butanolato, tris(dioctyl)pyrophosphato-O; zirconium IV 1,1 (bis-2-propenolatomethyl)butanolato, tris(2-amino) phenylato; zirconium IV bis 2,2(bis-2-propenolatamethyl) butanolato, bis(para amino)benzoato-O;titanium IV (bis-2-propenolatomethyl) -1-butanolato, bis(dioctyl) pyrophosphato-O, (adduct) 3 moles N,N-dimethylamino-alkyl propenoamide and zirconium IV 2-ethyl, 2-propenolatomethyl 1,3-propanediolato, cyclo di 2,2-(bis 2-propenolatomethyl) butanolato pyrophosphato-O,O.

3. The construction material of claim 2, wherein the at least one metallate additive is selected from the group consisting of titanium IV 2,2 (bis 2-propenolatomethyl)butanolato, tris (dodecyl)benzenesulfonato-O and titanium IV, tris[2-[(2-aminoethyl)amino]ethanolato-O], 2-propanolato.

4. The construction material of claim 1, wherein the at least one metallate additive is in the form of one of an aqueous emulsion and an aqueous solution.

5. The construction material of claim 4, wherein the one of an aqueous emulsion and an aqueous solution further comprises a surfactant.

6. The construction material of claim 1, wherein the at least one metallate additive comprises a first metallate additive and a second metallate additive.

7. The construction material of claim 6, wherein the first metallate additive is hydrophilic and the second metallate additive is hydrophobic.

8. The construction material of claim 7, wherein the first metallate additive is about 0.6% by weight of a combined mass of the binder and the oil-containing filler and wherein the second metallate additive is about 0.4% by weight of the combined mass of the binder and the oil-containing filler.

9. The construction material of claim 1, wherein the at least one binder is selected from the group consisting of cement, asphalt, and polymeric material.

10. The construction material of claim 9, wherein the polymeric material is a curable resin.

11. The construction material of claim 10, wherein the curable resin is a two component epoxy resin/hardener system.

12. The construction material of claim 1, wherein the at least one oil-containing filler contains oil in the range from about 1% to about 10% by weight of the oil-containing filler.

13. The construction material of claim 12, wherein the at least one oil-containing filler is primarily sand.

14. The construction material of claim 13, wherein the at least one oil-containing filler is derived from an oil spill.

15. The construction material of claim 13, wherein the at least one binder is cement and an oil-containing filler to binder mass ratio is about 2:1.

16. The construction material of claim 12, wherein the at least one oil-containing filler is primarily at least one of barium sulfate and calcium sulfate.

17. The construction material of claim 16, wherein the at least one oil-containing filler comprises waste drilling mud.

18. The construction material of claim 16, wherein the at least one binder is cement and an oil-containing filler to binder mass ratio is about 3:1.

19. The construction material of claim 1, wherein the construction material is one of an asphalt, asphalt emulsion, cement, concrete, polymer modified concrete, 2-K epoxy, 2-K polyurethane, mortar, stucco, grout, coating, insulation, surfacing material, sub-roofing fill, decking sheet, roofing shingle, insulation sheet, siding, sealant or adhesive.

20. A method comprising: utilizing the construction material of claim 1 as an asphalt, asphalt emulsion, cement, concrete, polymer modified concrete, 2-K epoxy, 2-K polyurethane, mortar, stucco, grout, coating, insulation, surfacing material, sub-roofing fill, decking sheet, roofing shingle, insulation sheet, siding, sealant or adhesive.

21. A method of making a construction material, comprising the steps of:
(1) combining:
(a) at least one binder;
(b) at least one oil-containing filler; and
(c) at least one metallate additive according to formula (1)

$$(RO)_m\text{-}M\text{-}(O_a\text{—}X_b\text{—}R'_c\text{—}Y_d)_n \quad (1);$$

wherein:
M is one of titanium and zirconium;
R and R' are independently a monovalent alkyl, alkenyl, alkynyl, aralkyl, aryl or alkaryl group having up to 20 carbon atoms or a halogen or ether substituted derivatives thereof;
O is oxygen;
X is selected from the group consisting of carboxyl, alcoholate, sulfonyl, phosphate, pyrophosphate, and phosphite;
Y is one of a methacrylate, acrylate, mercapto and an amine group;
m is an integer from 1 through 4; n is an integer from 0 through 3; and a, b, c and d are independently either 0 or 1.

22. The method of making a construction material of claim 21, wherein the combining step (1) further comprises the steps of:
(i) combining the oil-containing filler and the binder together; and
(ii) combining a first metallate additive of the at least one metallate additive with the composition of step (i).

23. The method of making a construction material of claim 22, wherein the first metallate additive is in the form of one of an aqueous emulsion and an aqueous solution.

24. The method of making a construction material of claim 23, wherein the one of an aqueous emulsion and an aqueous solution further comprises a surfactant.

25. The method of making a construction material of claim 22, further comprising the steps of:
(2) combining a second metallate additive of the at least one metallate additive with the composition of step 1.

26. The method of making a construction material of claim 25, wherein at least one of the first metallate additive and the second metallate additive is in the form of one of an aqueous emulsion and an aqueous solution.

27. The method of making a construction material of claim 26, wherein the one of an aqueous emulsion and an aqueous solution further comprise a surfactant.

28. The method of making a construction material of claim 25, wherein the first metallate additive is hydrophilic and the second metallate additive is hydrophobic.

29. The method of making a construction material of claim 25, wherein the second metallate additive is in the form of an emulsion.

30. The method of making a construction material of claim 29, wherein the emulsion further comprises a surfactant.

31. The method of making a construction material of claim 25, wherein the first metallate additive is about 0.6% of a combined mass of the binder and the oil-containing filler and wherein the second metallate additive is about 0.4% of the combined mass of the binder and the oil-containing filler.

32. The method of making a construction material of claim 25, wherein the binder is cement, and at least the first metallate additive has a pH of at least 7.

33. The method of making a construction material of claim 25, wherein the first metallate additive is titanium IV, tris[2-[(2-aminoethyl)amino]ethanolato-O], 2-propanolato and wherein the second metallate additive is titanium IV 2,2 (bis 2-propenolatomethyl)butanolato, tris(dodecyl)benzenesulfonato-O.

34. The method of making a construction material of claim 21, wherein the combination step (1) further comprises the steps of:
(i) first combining the at least one oil-containing filler and the at least one binder together; and
(ii) then combining a first metallate additive of the at least one metallate additive with the composition of step (i);
wherein the method further comprises the steps of:
(2) combining a second metallate additive of the at least one metallate additive; and
wherein at least one of the first metallate additive and the second metallate additive is in the form of one of an aqueous emulsion and an aqueous solution.

35. The method of making a construction material of claim 34, wherein the one of an aqueous emulsion and an aqueous solution further comprises a surfactant.

36. The method of making a construction material of claim 22, further comprising the steps of:
(2) combining a resin component of a curable resin with the composition of step 1;
(3) combining a second metallate additive of the at least one metallate additive with the composition of step 2; and
(4) combining a hardening component of the curable resin with the composition of step 3.

37. The method of making a construction material of claim 36, wherein the binder is at least one of an asphalt and a cement, and the curable resin is an epoxy resin.

38. A construction material prepared by the steps of:
(1) combining:
(a) at least one binder;
(b) at least one oil-containing filler; and
(c) at least one metallate additive according to formula 1:

$$(RO)_m\text{-}M\text{-}(O_a\text{—}X_b\text{—}R'_c\text{—}Y_d)_n (1)$$

wherein:
M is one of titanium and zirconium;
R and R' are independently a monovalent alkyl, alkenyl, alkynyl, aralkyl, aryl or alkaryl group having up to 20 carbon atoms or a halogen or ether substituted derivatives thereof;
O is oxygen;
X is selected from the group consisting of carboxyl, alcoholate, sulfonyl, phosphate, pyrophosphate, and phosphite;
Y is one of a methacrylate, acrylate, mercapto and an amine group;
m is an integer from 1 through 4; n is an integer from 0 through 3; and a, b, c and d are independently either 0 or 1.

* * * * *